US008131939B2

(12) United States Patent
Palomar et al.

(10) Patent No.: US 8,131,939 B2
(45) Date of Patent: Mar. 6, 2012

(54) DISTRIBUTED SHARED I/O CACHE SUBSYSTEM

(75) Inventors: Armando Palomar, Cupertino, CA (US); Ronald K. Kreuzenstein, Sunnyvale, CA (US); Ronald N. Hilton, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 1389 days.

(21) Appl. No.: 11/280,554

(22) Filed: Nov. 15, 2005

(65) Prior Publication Data

US 2006/0106992 A1    May 18, 2006

(51) Int. Cl.
*G06F 12/00* (2006.01)
(52) U.S. Cl. ....................... 711/141; 711/129
(58) Field of Classification Search ............... 711/141, 711/129
See application file for complete search history.

(56) References Cited

U.S. PATENT DOCUMENTS

| 5,265,235 A | 11/1993 | Sindhu et al. | 395/425 |
| 5,537,574 A | 7/1996 | Elko et al. | 395/468 |
| 6,098,156 A * | 8/2000 | Lenk | 711/146 |
| 2003/0028514 A1 | 2/2003 | Lord et al. | 707/1 |
| 2004/0073623 A1* | 4/2004 | Benkual et al. | 709/213 |

FOREIGN PATENT DOCUMENTS

| JP | 2000163317 A | 6/2000 |
| JP | 2000311112 A | 11/2000 |
| WO | WO 03/025802 A1 | 3/2003 |
| WO | WO 2006/014573 A2 | 2/2006 |

OTHER PUBLICATIONS

English translation for JP2000163317 (A).
English translation for JP2000311112 (A).
U.S. Provisional Application U.S. Appl. No. 60/586,364 entitled "Systems and Methods for Providing Distributed Cache Coherence".
Second Examination Report for Application No. GB-710961.4 dated Sep. 15, 2008.
Examination Report under Section 18(3); GB0710961.4; Feb. 17, 2009.

* cited by examiner

*Primary Examiner* — Yong Choe
(74) *Attorney, Agent, or Firm* — Steven Chiu, Esq.; Blanche E. Schiller, Esq.; Heslin Rothenberg Farley & Mesiti P.C.

(57) ABSTRACT

A method and system for a decentralized distributed storage data system. A plurality of central processors each having a cache may be directly coupled to a shared set of data storage units. A high speed network may be used to communicate at a physical level between the central processors. A coherency protocol may be used to communicate at a logical level between the central processors.

17 Claims, 5 Drawing Sheets

DISTRIBUTED SHARED I/O CACHE SUBSYSTEM

The present invention relates to caching the memory of a mainframe computer system and, in particular, to distributed shared input/output cache subsystems.

Distributed shared data storage systems typically have required a centralized coupling facility in order to operate properly. FIG. 1 illustrates in a block diagram a typical "Sysplex" configuration 100. A set of mainframe computer systems each having a central processor 110 may access data stored in a set of data storage units 120, such as a disk drive, via a control unit 130. Each control unit 130 is equipped with an input/output cache 140 to mitigate the delay associated with accessing the data storage units 120. The central processors 110 are clustered together via a coupling facility 150 which provides a cache 160 to mitigate the overhead associated with sharing data.

This layout greatly increases the size and overhead that such systems require. A more efficient system would greatly improve computing power.

DETAILED DESCRIPTION

A method and system for a decentralized distributed storage data system. A plurality of central processors each having a cache may be directly coupled to a shared set of data storage units. A high speed network may be used to communicate at a physical level between the central processors. A coherency protocol may be used to communicate at a logical level between the central processors.

Figure 1:
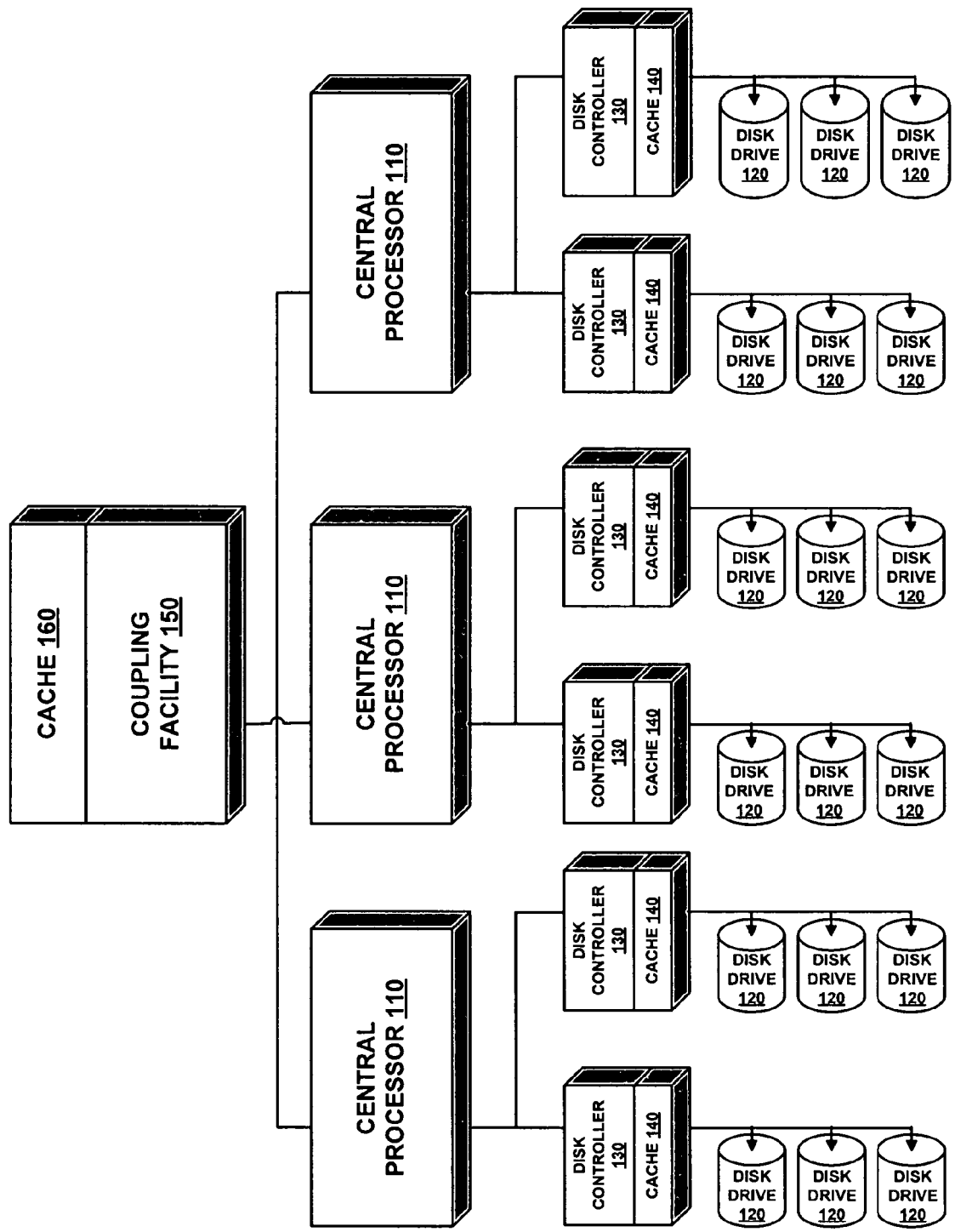
FIG. 1 is a diagram of one embodiment of a prior art shared cache subsystem.
Figure 2:
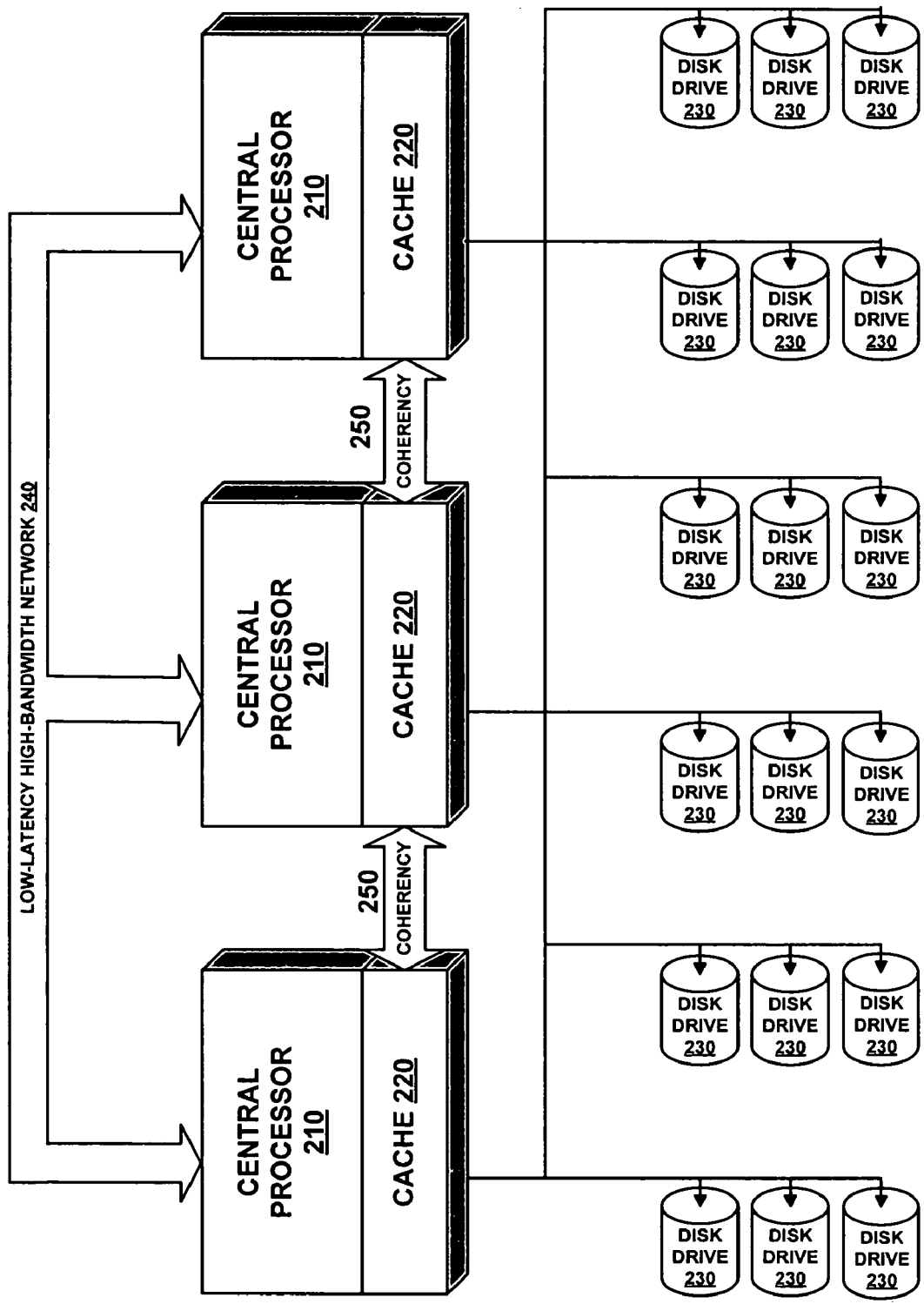
FIG. 2 is a diagram of one embodiment of a distributed shared cache subsystem according to the present invention.

FIG. 2 illustrates in a block diagram one embodiment of a distributed storage data system 200. A set of mainframe computer systems, each having a central processor 210 and an associated input/output cache 220, may access a set of shared data storage units 230. By locating the cache 220 within the systems themselves, both a significant cost savings and performance improvement may be realized. The coupling facility 150 and control units 130 are all eliminated, and the cache 220 may be brought closer to each central processor 210. At the physical level this may be made possible by a high-speed network 240 between the systems. At the logical level control unit functionality and a coherency protocol 250 may be provided to facilitate data sharing between the systems. A copy of the shared data may be held in the cache 220 of each system which needs access to that data.

Figure 3:
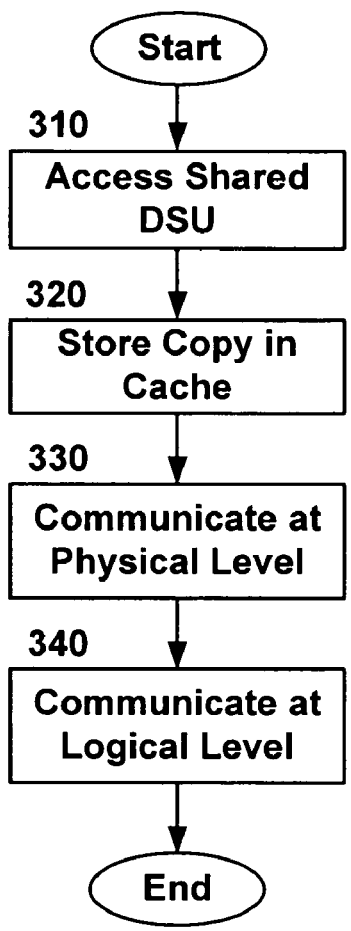
FIG. 3 illustrates in a flowchart one embodiment of a method of using the distributed storage data system.

FIG. 3 illustrates in a flowchart one embodiment of a method 400 of using the distributed storage data system 200. A central processor 210 may access a set of shared data storage units (DSU) 230 (Block 310). The central processor 210 may store a first copy of a set of shared data in the cache 220 coupled to the central processor 210 (Block 320). The central processors 210 may communicate at a physical level via a high speed network 240 (Block 330). The central processors may communicate at a logical level using a coherency protocol 250 (Block 340).

Figure 4:
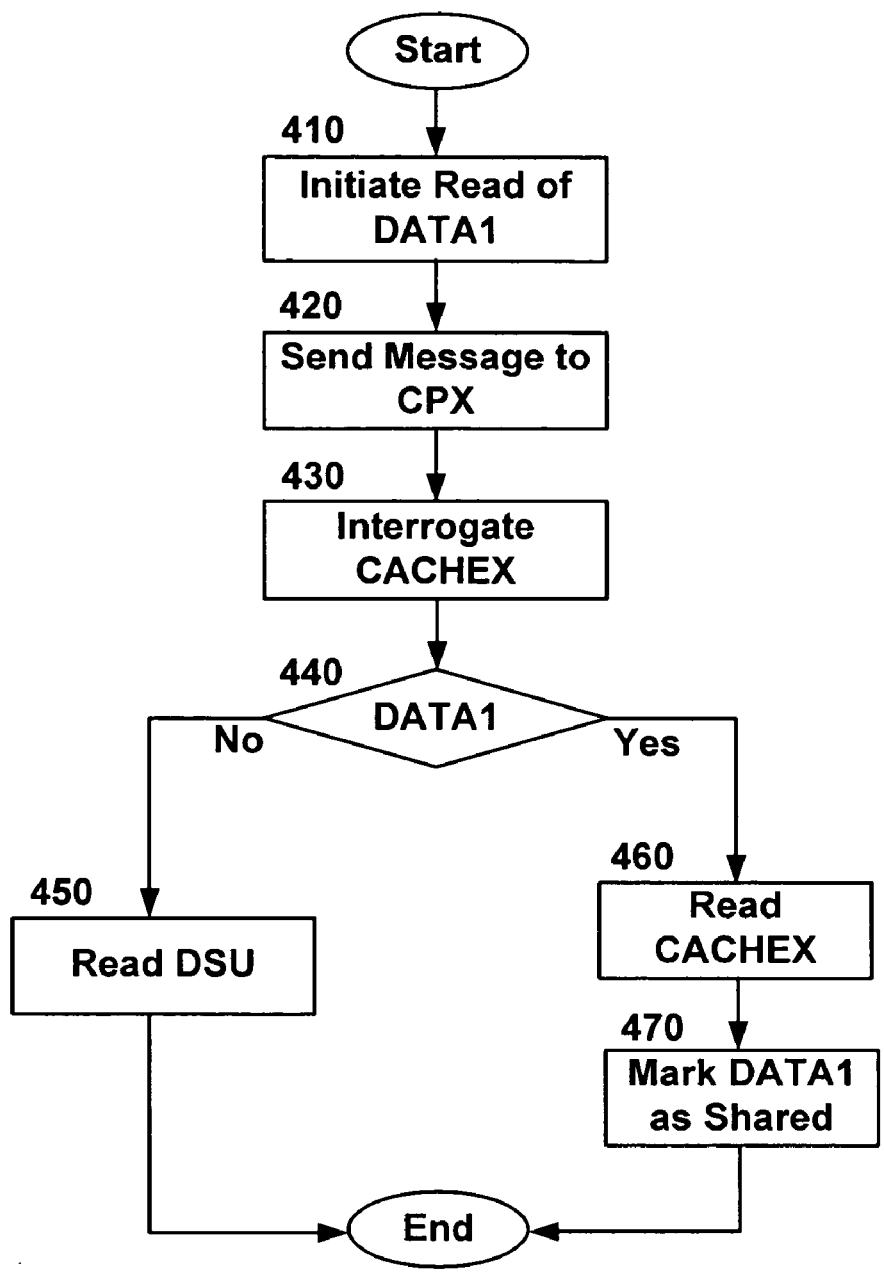
FIG. 4 illustrates in a flowchart one embodiment of a read method using the distributed storage data system 300.

FIG. 4 illustrates in a flowchart one embodiment of a read method 400 using the distributed storage data system 200. A reading central processor 210 may initiate a read of a first set of data (DATA1) (Block 410). The reading central processor 210 initially looks into its local cache 220 to determine if it has a copy of the data, and may send a message to all other central processors (CPX) 210 in the sysplex (Block 420). The message may cause each CPX to interrogate the cache (CACHEX) 220 of each CPX 210 (Block 430). Alternatively, the cache may send the read data to each of the other caches (CACHEX). If a copy of DATA1 is not present in any of the CACHEX (Block 440), the reading central processor 210 reads DATA1 from the data storage unit (DSU) 230 (Block 450). If the first copy of DATA1 is present in CACHEX 220 (Block 440), the reading central processor 210 may read a copy of DATA1 from CACHEX 220 (Block 460). The reading central processor 220 may mark all copies of DATA1 present on CACHEX as shared (Block 470). This may be accomplished by marking a flag bit in the header of the data indicating the data is shared or by other methods known in the art.

Figure 5:
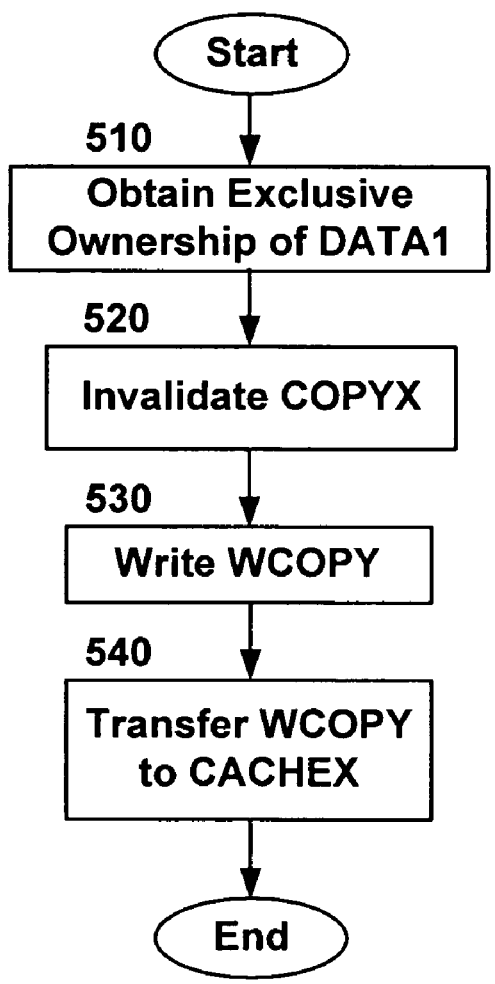
FIG. 5 illustrates in a flowchart one embodiment of a write method using the distributed storage data system.

FIG. 5 illustrates in a flowchart one embodiment of a write method 600 using the distributed storage data system 200. A writing central processor 210 may obtain exclusive ownership of DATA1 (Block 510). This may be accomplished by marking a flag bit in the header of the data indicating the data is exclusively owned or by other methods known in the art. The writing central processor 210 may invalidate all other copies (COPYX) of DATA1 stored in other caches (CACHEX) 220 (Block 520). The WCP 210 may then write to its copy (WCOPY) of DATA1 (Block 530). The WCP 210 may then transfer WCOPY to CACHEX 220 (Block 540). The WCOPY may be transferred by sending the written data directly to CACHEX 220 or directing the other processors (PROCX) 210 to read the data storage area where the new data was written.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A method comprising:
    accessing a first set of shared data storage units with a first mainframe computer system having a first central processor and an associated first cache, the first mainframe computer system directly coupled to the first set of shared data storage units;
    accessing the first set of shared data storage units with a second mainframe computer system having a second central processor and an associated second cache, the second mainframe computer system directly coupled to the first set of shared data storage units; and
    communicating at a physical level between the first mainframe computer system and the second mainframe computer system via a high speed network.

2. The method of claim 1, further comprising communicating at a logical level between the first mainframe computer system and the second mainframe computer system using a coherency protocol.

3. The method of claim 1, further comprising:
    storing a first copy of a set of shared data in the first cache; and storing a second copy of the set of shared data in the second cache.

4. The method of claim 1, further comprising:
reading with the second central processor a first set of data from a shared data storage unit of the set of shared data storage units; and
sending a message to the first cache to interrogate the first cache whether the first cache contains a first copy of the first set of data.

5. The method of claim 4, further comprising:
retrieving a second copy of the first set of data from the first cache; and
marking the first copy and the second copy as being shared.

6. The method of claim 5, further comprising:
obtaining exclusive ownership of the first set of data for the first central processor;
invalidating the second copy; and
writing to the first copy.

7. A set of instructions residing in a storage medium, said set of instructions capable of being executed by a storage controller to implement a method for processing data, the method comprising:
accessing a first set of shared data storage units with a first mainframe computer system having a first central processor and an associated first cache, the first mainframe computer system directly coupled to the first set of shared data storage units;
accessing the first set of shared data storage units with a second mainframe computer system having a second central processor and an associated second cache, the second mainframe computer system directly coupled to the first set of shared data storage units; and
communicating at a physical level between the first mainframe computer system and the second mainframe computer system via a high speed network.

8. The set of instructions of claim 7, further comprising communicating at a logical level between the first mainframe computer system and the second mainframe computer system using a coherency protocol.

9. The set of instructions of claim 7, further comprising:
storing a first copy of a set of shared data in the first cache; and
storing a second copy of the set of shared data in the second cache.

10. The set of instructions of claim 7, further comprising:
reading with the second central processor a first set of data from a shared data storage unit of the set of shared data storage units; and
sending a message to the first cache to interrogate the first cache whether the first cache contains a first copy of the first set of data.

11. The set of instructions of claim 10, further comprising:
retrieving a second copy of the first set of data from the first cache; and
marking the first copy and the second copy as being shared.

12. The set of instructions of claim 11, further comprising:
obtaining exclusive ownership of the first set of data for the first central processor;
invalidating the second copy; and
writing to the first copy.

13. A shared data storage system comprising:
a first set of data storage units;
a first mainframe computer system having a first central processor and an associated first cache directly coupled to the first set of data storage units;
a second mainframe computer system having a second central processor and an associated second cache directly coupled to the first set of data storage units; and
a high speed network to communicate at a physical level between the first mainframe computer system and the second mainframe computer system.

14. The shared data storage system of claim 13, wherein a coherency protocol communicates at a logical level between the first mainframe computer system and the second mainframe computer system.

15. The shared data storage system of claim 13, wherein the first cache stores a first copy of a set of shared data in the first cache and the second cache stores a second copy of the set of shared data.

16. The shared data storage system of claim 13, wherein:
the second central processor reads a first set of data from a shared data storage unit of the set of shared data storage units;
the second central processor sends a message to the second cache to interrogate the second cache whether the second cache contains a first copy of the first set of data;
the second central processor retrieves a second copy of the first set of data from the first cache; and
the first central processor marks the first copy as being shared; and
the second central processor marks the second copy as being shared.

17. The shared data storage system of claim 16, wherein the first central processor obtains exclusive ownership of the first set of data and writes to the first copy and the second central processor invalidates the second copy.

* * * * *